United States Patent
Langmeier

(10) Patent No.: US 10,702,022 B2
(45) Date of Patent: Jul. 7, 2020

(54) METHOD FOR PRODUCING AN INDIVIDUAL PATIENT-DATA-BASED MODULAR-STRUCTURE FOOT SOLE LAST AND FOR DETERMINING THE MATERIALS AND THE STRUCTURE OF AN INDIVIDUAL PATIENT-DATA-BASED INSOLE

(71) Applicant: Fatmir Langmeier, Rohrdorf (DE)

(72) Inventor: Fatmir Langmeier, Rohrdorf (DE)

(*) Notice: Subject to any disclaimer, the term of this patent is extended or adjusted under 35 U.S.C. 154(b) by 167 days.

(21) Appl. No.: 14/427,141

(22) PCT Filed: Sep. 10, 2013

(86) PCT No.: PCT/DE2013/000505
§ 371 (c)(1),
(2) Date: Mar. 10, 2015

(87) PCT Pub. No.: WO2014/040581
PCT Pub. Date: Mar. 20, 2014

(65) Prior Publication Data
US 2015/0237966 A1   Aug. 27, 2015

(30) Foreign Application Priority Data

Sep. 11, 2012  (DE) .................. 10 2012 017 882

(51) Int. Cl.
| | | |
|---|---|---|
| *A43D 3/02* | (2006.01) | |
| *A43D 1/02* | (2006.01) | |
| *B29D 35/12* | (2010.01) | |

(52) U.S. Cl.
CPC .............. *A43D 3/021* (2013.01); *A43D 1/02* (2013.01); *A43D 1/025* (2013.01); *A43D 3/027* (2013.01); *B29D 35/122* (2013.01); *B29D 35/128* (2013.01)

(58) Field of Classification Search
CPC .......... A43D 3/021; A43D 3/027; A43D 1/02; A43D 1/025; B29D 35/122; B29D 35/128
(Continued)

(56) References Cited

U.S. PATENT DOCUMENTS 1,191,834 A * 7/1916 Russell .................. A43D 3/022
                                                              12/128 D
355,565 A    8/1931 Dunker
(Continued)

FOREIGN PATENT DOCUMENTS

| DE | 205 610 | 1/1909 |
|---|---|---|
| DE | 20 2012 008676 | 10/2012 |
| GB | 2 225 210 | 5/1990 |

OTHER PUBLICATIONS

Translation of the International Preliminary Report on Patentability for PCT/DE2013/000505 dated Mar. 11, 2015.
(Continued)

*Primary Examiner* — Jameson D Collier
*Assistant Examiner* — Jocelyn Bravo
(74) *Attorney, Agent, or Firm* — Nicholas Trenkle, Esq.; B. Aaron Schulman, Esq.; Stites & Harbison, PLLC

(57) ABSTRACT

Method for producing an individual foot sole last (15) for a patient (10) or sportsman by reference to measured values and/or medical findings which are obtained from the body of the patient (10) or sportsman, characterized in that the individual foot sole last (15) is constructed of individual pre-fabricated standard modules (17), wherein the standard modules (17) are selected from a module set, whereby by reference to the measured values and/or medical findings which are obtained from the body of the patient (10) or sportsman, an actual value for the foot mould is determined and this is compared with one or more predefined desired values and by reference to the result of the comparison and the knowledge of the standard modules (17) present in the
(Continued)

module set, those standard modules (17) are selected and combined in their sequence—or specified in their sequence—which come closest to the ideal individual foot sole last (15) determined by reference to the comparison of actual and desired value.

12 Claims, 3 Drawing Sheets

(58) Field of Classification Search
USPC ...... 700/97, 131; 702/155; 12/146 L, 133 A, 12/133 B, 128 D
See application file for complete search history.

(56) References Cited

U.S. PATENT DOCUMENTS

| | | | | |
|---|---|---|---|---|
| 1,868,526 A * | 7/1932 | Dodge | ................... | A43D 3/027 12/115.6 |
| 2,274,060 A * | 2/1942 | Hart | .................... | A43D 3/02 12/142 R |
| 2,805,432 A * | 9/1957 | Riggs | .................... | A43D 3/027 12/133 B |
| 4,523,345 A * | 6/1985 | Orea Mateo | ........... | A43D 3/027 12/133 R |
| 5,714,098 A * | 2/1998 | Potter | .................... | A43B 3/26 12/142 R |
| 5,746,952 A * | 5/1998 | Marshall | ................. | A43B 7/28 12/146 L |
| 5,879,725 A * | 3/1999 | Potter | .................... | A43B 3/26 425/403 |
| 6,042,759 A * | 3/2000 | Marshall | ................. | A43B 7/28 12/146 L |
| 7,069,665 B1 * | 7/2006 | Adriano | ................. | A43B 7/142 33/3 R |
| 7,153,457 B2 * | 12/2006 | Shor | .................... | A43D 1/022 12/142 N |
| 7,793,433 B2 * | 9/2010 | Hakkala | ................. | A43B 7/28 36/154 |
| 2004/0074112 A1 * | 4/2004 | Gislason | ................. | A43D 1/02 36/97 |
| 2006/0070260 A1 * | 4/2006 | Cavanagh | .............. | A43B 17/00 36/44 |
| 2006/0143839 A1 | 7/2006 | Fromme | | |
| 2007/0163147 A1 * | 7/2007 | Cavanagh | .............. | A43B 17/00 36/44 |
| 2009/0295015 A1 * | 12/2009 | Kuntz | ................... | B29C 33/308 264/135 |

OTHER PUBLICATIONS

International Search Report for PCT/DE2013/000505 dated Jan. 3, 2014.

Applicant Reply dated Jul. 2, 2014 in response to written communication of the International Searching Authority.

* cited by examiner

METHOD FOR PRODUCING AN INDIVIDUAL PATIENT-DATA-BASED MODULAR-STRUCTURE FOOT SOLE LAST AND FOR DETERMINING THE MATERIALS AND THE STRUCTURE OF AN INDIVIDUAL PATIENT-DATA-BASED INSOLE

The present invention relates to a method for the patient-data-based selection of zone-specific modules of a modular-structure foot sole last divided into a plurality of zones and/or for the patient-data-based determination of the materials and structure of the insole to be moulded on the foot sole last by action of heat and vacuum pressing having the features specified in the preamble of patent claim 1.

It is known from the prior art—within the framework of the so-called "drawer technique"—for the preparation of insoles to make the patient or sportsman tread in a foot impression foam box where the foot impression foam compresses and deforms whilst adapting to the shape of the sole region of the patient or sportsman.

Subsequently the foot sole imprint in the foot impression foam is filled with plaster or polyurethane foam and the foot sole positive image removed from the foot impression foam mould is modelled from plaster or polyurethane foam. Usually the person selling an insole then selects a ready-made insole corresponding to the size of the plaster or polyurethane foam imprint from the ready-made insoles which he has in stock and sells this to the patient or sportsman who is searching for an insole.

This procedure for preparing a ready-made insole, which is known as the "drawer technique" and is very widely used today, is particularly disadvantageous because the ready-made insole selected from the stock randomly (still) present at the insole seller with his assistance is not sufficiently adapted to the patient-specific individual needs of the patient or sportsman. The rate of complaints with these ready-made insoles provided by the "drawer technique" is therefore very significant.

It is furthermore known from the prior art to produce an individualized sole last by means of a CNC milling machine available on site at the insole manufacturer and to create insoles made of thermoplastic material using this individualized sole last.

The use of a CNC milling machine available on site at each insole manufacturer is disadvantageous in many respects:

Thus, the acquisition costs for a CNC milling machine are particularly high and as a result, frequently prevent an economically meaningful use at the location of the insole seller. Furthermore, the operation and maintenance of a CNC milling machine requires technical staff trained in CNC milling which is frequently not available—specifically in remote areas—and if available, requires the commitment of high staff costs.

Another disadvantage of CNC milling can be seen in that it requires a significant time (about 15 minutes) for the milling of a sole last.

The use of CNC milling is also disadvantageous on account of the large amount of accumulating waste since the sole last there is milled from a solid material block and the material excess projecting beyond the sole last accumulates as milled waste.

It is therefore the object of the present invention to provide a method which allows the manufacture of individualized insoles which exactly take into account the personal data of a patient or sportsman and thereby brings about a particularly low rate of complaints for the manufactured insoles, which makes the presence of a CNC milling machine on site at sales outlets even for extremely individualized insoles superfluous and thereby avoids high acquisition costs, operating costs, maintenance costs and costs for technical staff, which permits the manufacture even of extremely individualized insoles in a very short time (two to five minutes per insole) even by an orthopaedically untrained person and which eliminates a dreaded waste problem of CNC milling machines caused by milled residues.

According to the invention, this object is solved by a generic method having the features of patent claim 1. Particularly preferred further developments of the method are the subject matter of the subclaims.

Exemplary embodiments of the invention are described in detail with reference to the drawings. In the figures.

Figure 1:
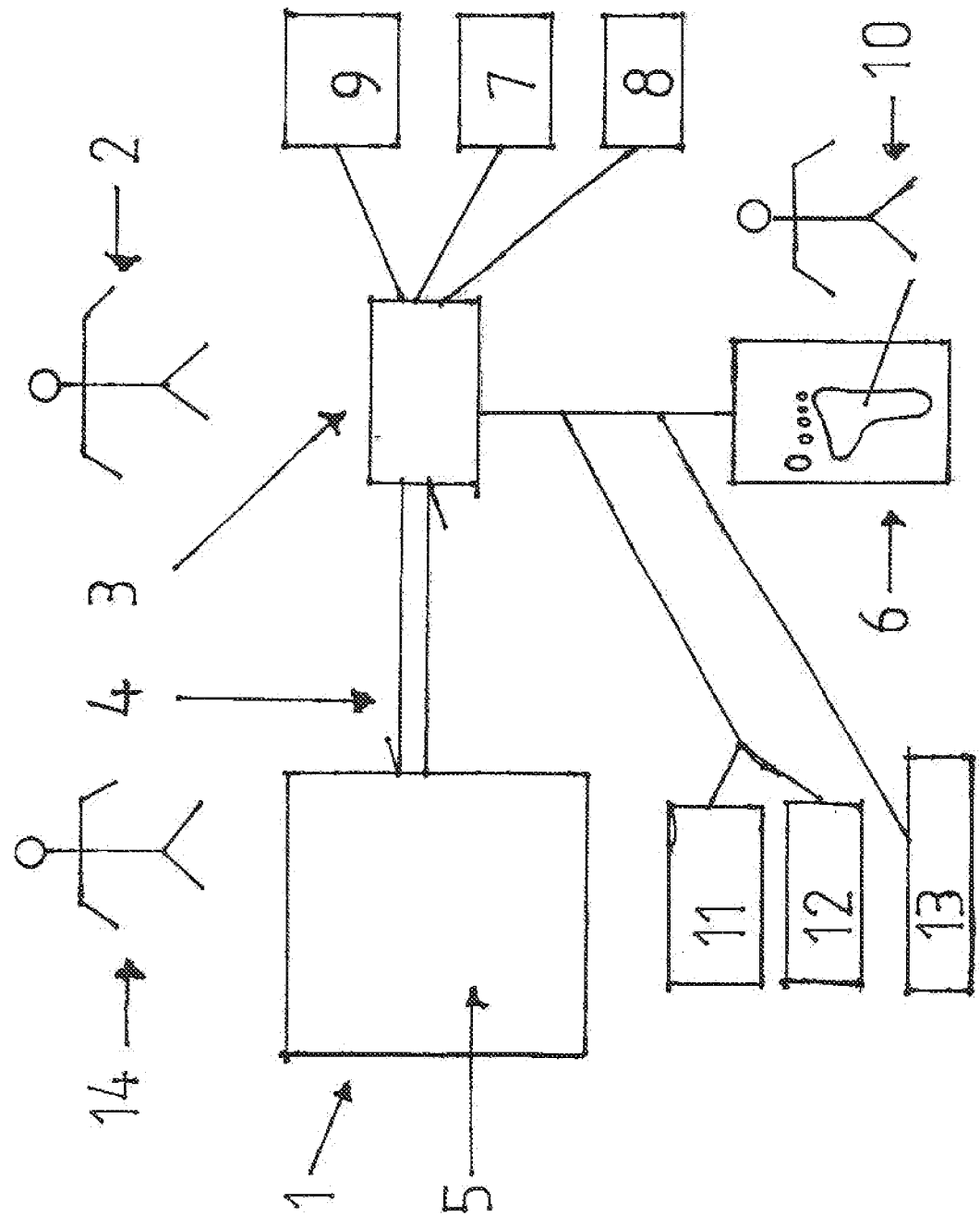
FIG. 1 shows a schematic diagram of the sequence of a compilation according to the invention of a suitable individual foot sole last (15)
Figure 2:
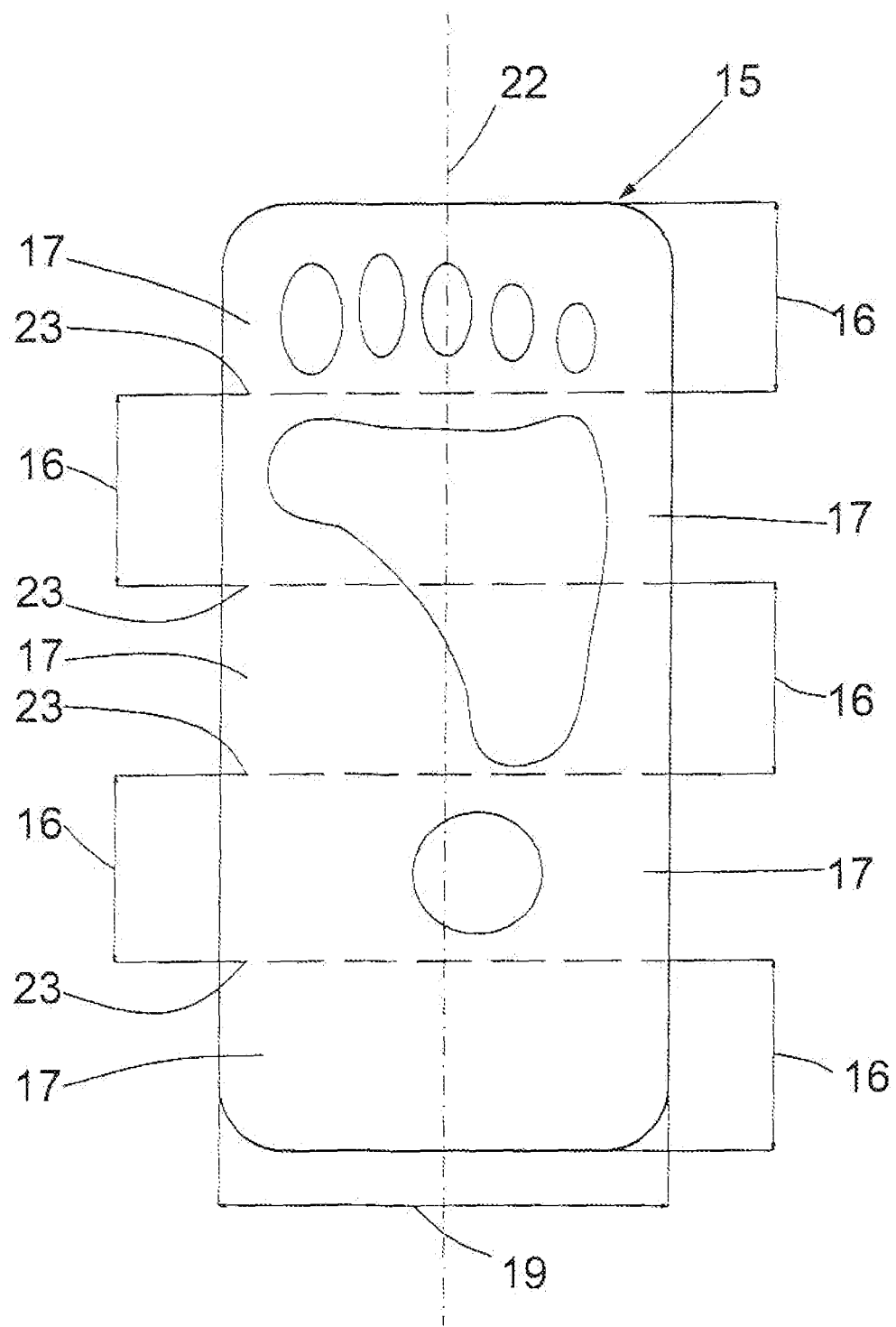
FIG. 2 shows individual foot sole last (15) created according to the invention.
Figure 3:
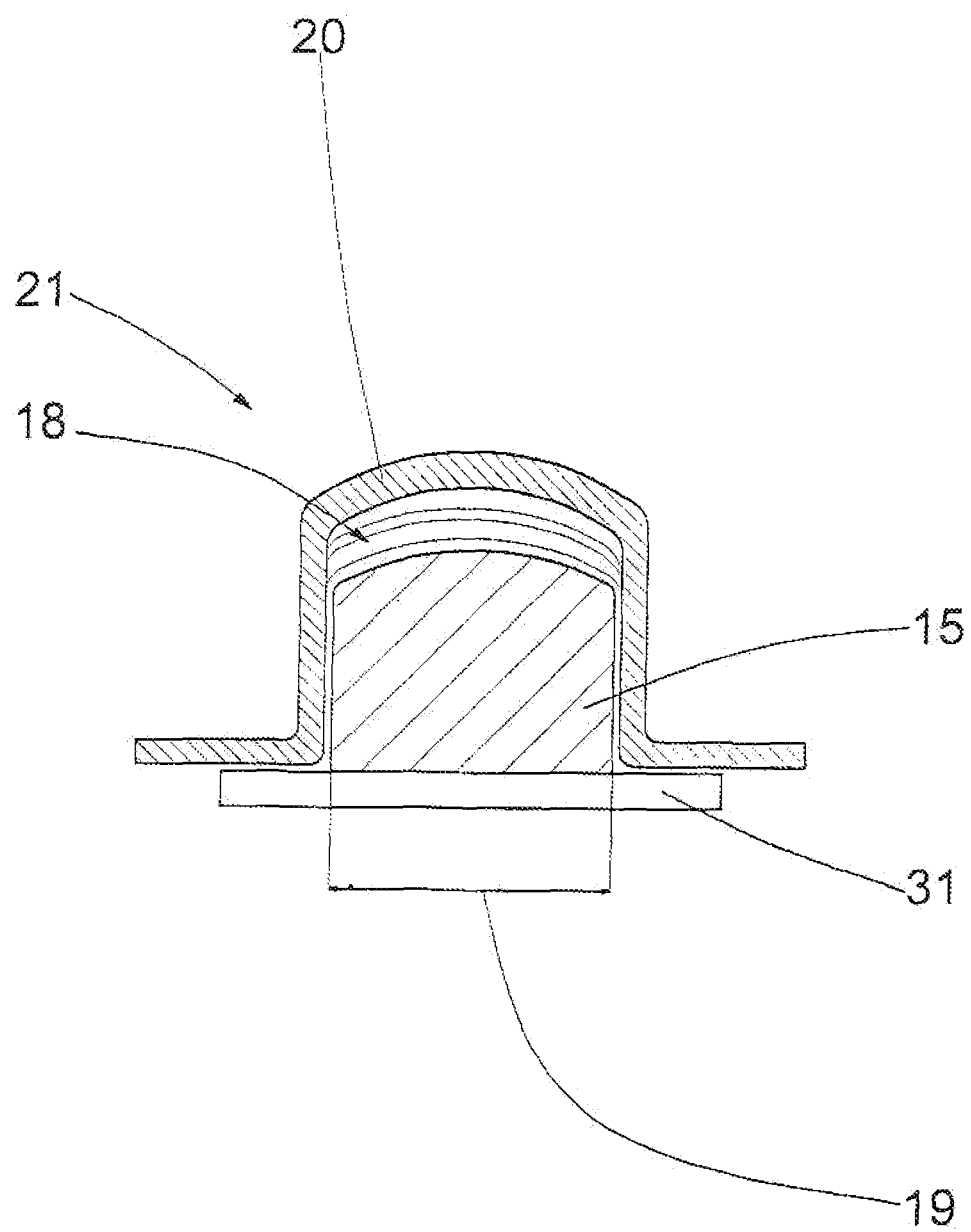
FIG. 3 shows a schematic creation of an individual patient-data-specific insole (18) by vacuum pressing of layers of a thermoplastically deformable insole (18) onto an individual foot sole last (15).

Data and programs (5) for carrying out the method according to the invention are installed on a central server (1)—or on the computers (3) on site. The users (2) [=orthopaedic shoe engineer, orthopaedic engineer, pedologist, physiotherapist, physicians, orthopaedists] of the method (5) according to the invention can be situated at any locations and are optionally connected with their user computers (3) via an arbitrary data connection (4) to the central sever (1) or have the required data and programs (5) for carrying out the method according to the invention available on their computers (3) on site.

In the central server (1) or in the user computers (3) it is input—either by the server operator (14) or by the user (2) of the method according to the invention or by a foot sole last module set manufacturing machine—which previously manufactured foot sole last modules (17) are actually available to the user (2) located at an arbitrary location.

Modular-structure foot sole lasts (15) divided into three to ten zones (16) provided consecutively according to foot length are manufactured centrally depending on shoe size for delivery to the users (2). For each zone (16) of the foot sole last (15), one to six differently shaped standard modules (17) provided on their upper side with recesses and/or elevations are delivered to the user (2) in the form of a module set.

Usually the entire width of each standard module (17) extends over the entire width (19) of the foot sole last (15).

Alternatively to this, per zone (16) of the foot sole last (15)—instead of a single module (17)—two or more modules (17) provided adjacently to one another can be used.

An essential feature of the foot sole last (15) manufactured by the method according to the invention and described in a separate simultaneous patent application of the same applicant, is that the transitions between two neighbouring zones (16) of the foot sole last (15) are each configured to be continuously smooth and stepless although the modules (17) pertaining to a specific zone (16) each have different orthopaedically meaningful elevations and/or recesses.

This means: for the compilation of a patient-specific, modular-structure sole last (15), the user (2) receives on suite from a central server (1) or from his computer (3)

located on site merely the information as to which module (17) (e.g. module 3 of a total of 5 modules which come into question for the respective zone (16)) he is to select and arrange consecutively and/or adjacently from the module set available to him. Each module set available to the user (2) on site contains 1 to 10 standard modules (17) per zone (16) of the foot sole last (15) to be created, where the foot sole last (15) can comprise 3 to 15 zones (16) located consecutively and adjoining one another in a gapless and stepless manner along the longitudinal axis of the foot sole last (15).

This information of one or several quite specific modules (17) per zone (16) should be determined by the method (5) according to the invention on the basis of patient-specific data and notified to the user on site—for example, via the internet (4)—by screen (8) and/or printer (7).

Furthermore, the method according to the invention can notify the user (2) which material with which properties (damping and elastic, soft or hard) and in which region of the sole last (15) he should use to produce the insole (18) and mould thermoplastically with the aid of the previously described sole last (15) (thermal vacuum pressing).

The computers (3) of the users on site can each be connected to a pedobarographic pressure measuring plate (6) and/or to a pedobarographic pressure measuring treadmill (11) and/or to a pedobarographic inner shoe pressure measuring sole (12) located at the site of the user (2) and in all three cases (6, 11, 12)—however only optionally—can additionally be connected to a so-called back scanner (13) but always to a printer (7) and/or to a screen (8) and to a keypad (9).

Initially, usually the following data of the patient (10) or sportsman (10) who is searching for an insole (18) is input by the user (2) on site into his computer (3) and for example, transmitted by internet (4) to the central server (1):

1. Case history data (belongs to "medical findings" within the framework of the present invention; e.g. the presence of flat foot, talipes valgus, pes cavus, splayfoot, calcaneal spur, hammer toes, diagnoses such as diabetes etc.; assessment of the gait pattern; case history data originate, for example, from examination of the user (2) on site, information of the patient, prescription of a physician).
2. Additional patient data [belongs to "medical findings" within the framework of the present invention; patient=subsequent insole wearer; examples for "additional patient data": age, sex (female: connective tissue weakness more frequent), weight, shoe size, degree of activity (type of sport, for example: running, golf, dancing), type of shoe in which the insole (18) is to be inserted subsequently (for example, running shoe; hiking shoe, work shoe, therapeutic shoe, city shoe)].
3. Results of a movement check on the patient (10) or sportsman (10) [belongs to "medical findings" within the framework of the present invention; for example: muscle shortening of the locomotor system in particular: shortening of the: iliopsoas (groin muscle), quadriceps (femoral muscle), gastrocnemius (calf muscle), soleus (lower calf muscle), foot muscles: in particular shortening of the plantar fascia].
4. Results of a foot palpation [=kneading the foot; belongs to "medical findings" within the framework of the present invention; determination of the degree of mobility of the foot=determination of a numerical value on a scale, presence of a contraction]

By means of the pedobarographic pressure measuring plate (6) and/or to a pedobarographic pressure measuring treadmill (11) and/or to a pedobarographic inner shoe pressure measuring sole (12)—optionally in combination with a back scanner (13)—the following data (=measured values) of the patient (10) or sportsman (10) who is searching for an insole (18) are then read into the user computer (3) and for example, transmitted via the internet (4) to a central server (1):

1. Values of a static pedobarographic pressure measurement [=postural measurement: for assessment of the type of posture (ideal: centre of gravity lies—in a plan view—in the central region between toe and heel; deviations: centre of gravity can lie before or after central region=abnormal curvature of the spine for compensation and for prevention of any tilting of the patient (10) then required, can be at least partially compensated with insoles (18)].

By means of the pedobarographic pressure measuring plate (6) and/or to a pedobarographic pressure measuring treadmill (11) and/or to a pedobarographic inner shoe pressure measuring sole (12)—optionally in combination with a back scanner (13)—the following data (=measured values) of the patient (10) or sportsman (10) who is searching for an insole are then read into the user computer (3) and for example, transmitted via the internet (4) to a central server (1):

2. Values of a dynamic pedobarographic pressure measurement [=pressure measurement on footfall with heel, roll-over of the foot, push-off with ball and toe). Speed (defect: if not continuously the same speed over entire roll-over path but local delays) of the displacement of the centre of gravity from heel forwards in the direction of the toes and path shape (defect: if no continuously smooth centre-of-gravity displacement line but lateral protrusions in this line) of the migration of the centre of gravity. This gives an indication of any dynamic defects which may be present.

The path of the person's centre of gravity from footfall to push-off "over ground" is the "gait degradation line". Its rate of formation and profile shape are determined by the dynamic pressure measurement.

By means of the method according to the invention the spatial coordinates of an ideal foot sole last (15) are determined as the desired value from the patient-specific data (points 1. and 2.) input into the computer (3) of the user (2) and described further above and—optionally from a standard stasis related to the locomotor apparatus pertaining to this. Alternatively to this, size-dependent standard foot sole last spatial coordinates and—optionally a standard stasis pertaining to this—are stored on the server (1) as desired values.

By reference to the values (Points 1. to 4.) input into the computer (3) of the user (2) and the pressure measurement data (Points 1. and 2.) read in there, the method according to the invention can further determine the actual spatial coordinates of the foot bed of the patient (10) as the actual value.

The method now relates these desired values and actual values and determines from this an insert-specific patient-related correction value.

Since the method determines which modules [(17); e.g. modules Nos. 3, 8, 12 and 18 with a, for example, four-zone foot sole last (15)] of the foot sole last (15) to be manufactured are present in the module set of the user (2), knowing the correction value, the method can inform the user (2) which module (17) he should select and use per zone (16) of the foot sole last (15) to be manufactured by the user (2) since it selects and names that module (17) which at best or—most favourably—completely corresponds to the respective zone-specific correction value.

One of the most important advantages of the method according to the invention consists in the selection and the notification of respectively suitable standard modules (17) for the individual zones (16) of the foot sole last (15) from orthopaedic aspects.

Another essential advantage of the method according to the invention consists in that by reference to the correction value, it notifies the user (2) which thermoplastic material and which structure or material sequence and local material arrangements on the individual foot sole last (15) he has to use or realize to produce the insole (18).

The seller (2) on site then only needs to take out the standard module (17) specified by the method per zone (16) from the module set available to him and arrange the specified standard modules (17) zone-related consecutively and/or adjacently in order to obtain an absolutely individual foot sole last (15) which takes into account the patient's needs in a particularly distinct manner.

Following the removal from the module set and zone-related arrangement of the standard modules (17) specified by the method—or during this—the user (2) heats the thermoplastic material also specified by the method to produce the insole (18), where he has to take note of the type, sequence and arrangement (placement) of the materials specified by the method. The heated material layers are then placed on the modular-structure foot sole last (15)—in its function as shaper—and covered with the flexible cover (20) of a vacuum press (21). If a negative pressure is applied between the underside of the flexible cover (20) of the vacuum press (21) on the one hand and the modular-structure foot sole last (15) on the other hand, the shape of the flexible cover (20) adapts to the shape of the modular-structure foot sole last (15) in a clinging manner and thereby shapes the interposed thermoplastic insole material exactly to the contours of the upper side of the foot sole last (15) corresponding to the finished, extremely individualized insole (18).

Thanks to the use of the method according to the invention, the manufacture of an extremely individualized insole (18) can accordingly be made in a particularly short time (about 2 to 5 minutes)—dispensing with the use of technical staff and a CNC milling machine at the site of the user (2).

The insole (18) to be manufactured can, for example, comprise an orthopaedic insole, a therapeutic insole or a sports insole.

The subject matter of the present invention is also a method for producing an individual, patient-data-based insole (18) in which it is specified to the user (2)—for example on his screen—which thermoplastic material and which structure or which material sequence and local material arrangement he has to make on the modular-structure foot sole last (15) described in detail above, in order to produce the patient-data-based insole (18).

In particular, the subject matter of the present invention is further a method for producing an individual patient-data-based insole (18) in which the thermoplastic materials are heated, arranged on a modular-structure foot sole last (15) described in detail above and covered with the flexible cover (20) of a vacuum press (21).

Then a negative pressure is applied between the underside of the flexible cover (20) of the vacuum press (21) and the foot sole last (15) so that the shape of the flexible cover (20) is adapted to the shape of the foot sole last (15) and the thermoplastic materials adapt exactly to the contours of the upper side of the foot sole last (15) and after cooling, form the insole (18).

In summary, it should be noted that within the framework of the present invention a method is provided which—at any time and in any place—permits the manufacture of individualized insoles (18) which exactly take account of the personal data of a patient (10) or sportsman and thereby bring about a particularly low rate of complaints for the manufactured insoles (18).

A particular advantage of the method according to the invention can further be seen in that it no longer requires and even makes superfluous the presence of a CNC milling machine in a sales outlet even for extremely individualized insoles and as a result avoids high acquisition costs, operating costs, maintenance costs and costs for technical staff.

An essential advantage of the method according to the invention consists in that it even allows an orthopaedically untrained person to produce even extremely individualized insoles (18) in a very short time [two to five minutes per insole (18)].

The method according to the invention is finally also advantageous because it reliably eliminates the dreaded waste problem of CNC milling machines caused by milled residue.

The present invention therefore relates to a method for producing an individual foot sole last (15) for a patient (10) or sportsman by reference to measured values and/or medical findings which are obtained from the body of the patient (10) or sportsman.

Usually the individual foot sole last (15) is constructed of individual pre-fabricated standard modules (17), wherein the standard modules (17) are selected from a module set.

For this selection of the standard modules (17) within the framework of the method according to the invention, by reference to the measured values and/or medical findings which are obtained from the body of the patient (10) or sportsman, an actual value for the foot mould is determined.

In the method according to the invention, this actual value is then compared with one or more predefined desired values.

By reference to the result of the comparison and knowing the standard modules (17) actually present in the module set, those standard modules (17) are selected and combined in their sequence—or specified in their sequence—which come closest to the ideal individual foot sole last (15) determined by reference to the comparison of actual and desired value.

A particular advantage of the method according to the invention consists in that, in addition to the measured values, medical findings of the patient (10) or sportsman are used to determine the standard modules (17) for the individual foot sole last (15) and to determine the choice of material and the structure of the insole (18) to be formed on the foot sole last (15).

According to the method according to the invention, each individual foot sole last (15) is composed depending on shoe size of three to ten standard modules (17) arranged consecutively according to foot length.

In particularly preferred embodiments of the method according to the invention, therefore each individual foot sole last (15) is composed of standard modules (17) depending on shoe size, which can be arranged consecutively in zones (16) of the foot sole last (15), wherein one or more modules (17) can optionally be provided adjacent to one another in each zone (16) of the foot sole last (15).

A particular advantage of the method according to the invention consists in that depending on the measured values and/or the medical findings, a selection of the suitable material and the correct material properties of the insole (18) to be formed using the foot sole last (15) can be made.

Usually the measured values are obtained with one or more pedobarographic pressure measuring plates (6) and/or one or more pedobarographic pressure measuring treadmills (11) and/or with one or more pedobarographic inner shoe pressure measuring soles (12).

Within the framework of the method according to the invention, in addition to the measured values and/or medical findings, information on the intended usage of the insole (18) can also be used to determine the modules (17) for the individual foot sole last (15) and to determine the choice of material and the structure of the insole (18).

In particularly preferred embodiments of the method according to the invention, in addition to the measured values and/or medical findings, results of a foot palpation can also be used to determine the modules (17) for the individual foot sole last (15) and to determine the choice of material and the structure of the insole (18).

Usually the measured values are obtained by means of a static pedobarographic pressure measurement to determine the modules (17) for the individual foot sole last (15) and to determine the choice of material and the structure of the insole (18).

Alternatively or additionally to this, the measured values can be determined by means of a dynamic pedobarographic pressure measurement to determine the modules (17) for the individual foot sole last (15) and to determine the choice of material and the structure of the insole (18).

As a direct process product, the foot sole last (15) which can be produced by the method according to the invention, which has a modular structure and which can be individualized according to patient data is also the subject matter of the present patent application.

The invention claimed is:

1. A method for producing an individual scalable orthopedic insole for a patient or sportsman, said insole having a plantar structure, the method comprising:
    determining an actual value for a foot mould that represents a shape of a foot by reference to at least one of measured values and medical findings that have been obtained from a body of the patient or sportsman;
    comparing the actual value determined for the foot mould with one or more predefined desired values to determine an ideal scalable orthopedic insole last having a plantar structure for the patient or sportsman;
    selecting a consecutive sequence of modules from a set of pre-fabricated modules that most closely matches the ideal scalable orthopedic insole last determined for the patient or sportsman based on said compared value;
    constructing an individual scalable orthopedic insole last for the patient or sportsman by combining the selected modules in the consecutive sequence;
    heating a thermoplastic material;
    arranging the heated thermoplastic material on a plantar side of the individual scalable orthopedic insole last;
    covering the thermoplastic material on the plantar side of the individual scalable orthopedic insole last with a flexible cover of a vacuum press; and
    applying a negative pressure between an underside of the flexible cover of the vacuum press and the individual scalable orthopedic insole last, such that the thermoplastic material conforms to contours of the plantar side of the individual scalable orthopedic insole last and, upon cooling, forms the individual scalable orthopedic insole.

2. The method according to claim 1, wherein both measured values and medical findings that have been obtained from the body of the patient or sportsman are used to determine the actual value for the foot mould and to choose a material and a structure of an individual scalable orthopedic insole to be formed on the plantar side of the scalable orthopedic insole last.

3. The method according to claim 1, wherein the scalable orthopedic insole last is constructed, depending on shoe size, of three to ten modules selected from the set of scalable orthopedic insole last modules and arranged consecutively according to foot length.

4. The method according to claim 1, wherein the selected modules are arranged, according to a selected shoe size, consecutively in zones of the individual scalable orthopedic insole last, and wherein two or more of the selected modules are provided adjacent to one another in each zone of the individual scalable orthopedic insole last.

5. The method according to claim 1, wherein, depending on the at least one of the measured values and medical findings, a selection of a suitable material and correct material properties of the scalable orthopedic insole to be formed on the individual scalable orthopedic insole last is made.

6. The method according to claim 1, further comprising obtaining the measured actual values with at least one of one or more pedobarographic pressure measuring plates, one or more pedobarographic pressure measuring treadmills, and one or more pedobarographic inner shoe pressure measuring soles.

7. The method according to claim 1, wherein, in addition to the at least one of the measured actual values and medical findings, information on an intended usage of an insole to be formed on the individual scalable orthopedic insole is also used to determine the modules selected for the individual scalable orthopedic insole last and to determine a choice of material and a structure of the scalable orthopedic insole.

8. The method according to claim 1, wherein, in addition to the at least one of the measured actual values and medical findings, results of a foot palpation are also used to determine the modules selected for the individual foot sole last scalable orthopedic insole last and to determine a choice of material and a structure of the insole to be formed on the individual scalable orthopedic insole last.

9. The method according to claim 1, further comprising obtaining the measured values by means of a static pedobarographic pressure measurement to determine the modules selected for the individual scalable orthopedic insole last and to determine a choice of material and a structure of the insole to be formed on the plantar side of the individual scalable orthopedic insole last.

10. The method according to claim 1, further comprising obtaining the measured values by means of a dynamic pedobarographic pressure measurement to determine the modules selected for the individual scalable orthopedic insole last and to determine a choice of material and a structure of the insole to be formed on the individual scalable orthopedic insole last.

11. The method according to claim 1, further comprising, specifying at least one of a structure, a material sequence, and a local material arrangement to arrange on the individual scalable orthopedic insole last to produce the individual patient-data-based scalable orthopedic insole.

12. The method according to claim 11, wherein when the negative pressure is applied between the underside of the flexible cover of the vacuum press and the individual scalable orthopedic insole last, a shape of the flexible cover is adapted to a shape of the individual scalable orthopedic insole last.

* * * * *